(12) United States Patent
Leibinger

(10) Patent No.: US 9,873,635 B2
(45) Date of Patent: Jan. 23, 2018

(54) METHOD AND DEVICE FOR PRODUCING CEMENT CLINKER

(71) Applicant: Südbayerisches Portland-Zementwerk Gebr. Wiesböck & Co. GmbH, Rohrdorf (DE)

(72) Inventor: Helmut Leibinger, Ried im Innkreis (AT)

(73) Assignee: SUDBAYERISCHES PORTLAND-ZEMENTWERK GEBR. WIESBOCK & CO. GMBH, Rohrdorf (DE)

( * ) Notice: Subject to any disclaimer, the term of this patent is extended or adjusted under 35 U.S.C. 154(b) by 95 days.

(21) Appl. No.: 14/091,097

(22) Filed: Nov. 26, 2013

(65) Prior Publication Data
US 2014/0087319 A1 Mar. 27, 2014

Related U.S. Application Data

(63) Continuation of application No. PCT/EP2012/058939, filed on May 14, 2012.

(30) Foreign Application Priority Data

May 27, 2011 (DE) .................. 10 2011 050 677

(51) Int. Cl.
*C04B 7/43* (2006.01)
*B01D 53/34* (2006.01)
(Continued)

(52) U.S. Cl.
CPC .............. *C04B 7/43* (2013.01); *B01D 53/343* (2013.01); *B01D 53/8631* (2013.01); *F27B 7/20* (2013.01);
(Continued)

(58) Field of Classification Search
CPC .......... B01D 2258/0233; B01D 53/343; B01D 53/8631; F22D 17/004; F22D 17/008; F22B 17/20
(Continued)

(56) References Cited

U.S. PATENT DOCUMENTS 5,704,780 A * 1/1998 Bauer ........................... 432/106
2009/0193968 A1* 8/2009 Jepsen et al. ................... 95/134
(Continued)

FOREIGN PATENT DOCUMENTS

| DE | 197 56 392 | 7/1999 |
|---|---|---|
| DE | 10 2010 004 011 | 6/2011 |
| EP | 0 461 305 | 12/1991 |

OTHER PUBLICATIONS

Search Report and Written Opinion in International Application No. PCT/EP2012/058939 dated Dec. 6, 2012.
(Continued)

*Primary Examiner* — Alissa Tompkins
*Assistant Examiner* — Benjamin W Johnson
(74) *Attorney, Agent, or Firm* — Norton Rose Fulbright US LLP

(57) ABSTRACT

In a device for baking of clinker, heat generated in a furnace can be used in a particularly efficient and versatile manner if the heat generated in the furnace is transferred, by means of at least one first heat exchanger, to a heat carrier fluid, the heated heat carrier fluid is transported to at least one second heat exchanger, and the heat is then discharged to a heat sink, for example, in order to heat a flow of flue gas to a temperature required for denitrification thereof.

13 Claims, 1 Drawing Sheet

(51) Int. Cl.
    *B01D 53/86*     (2006.01)
    *F27B 7/20*     (2006.01)
    *F27D 17/00*     (2006.01)

(52) U.S. Cl.
    CPC ......... *F27D 17/004* (2013.01); *F27D 17/008* (2013.01); *B01D 2258/0233* (2013.01)

(58) Field of Classification Search
    USPC .......................................... 432/9, 77, 81, 82
    See application file for complete search history.

(56) References Cited

U.S. PATENT DOCUMENTS

| | | | | |
|---|---|---|---|---|
| 2010/0000406 | A1* | 1/2010 | Schwab et al. | 95/41 |
| 2010/0307388 | A1* | 12/2010 | Secklehner | 110/217 |
| 2011/0061569 | A1* | 3/2011 | Devroe | C04B 7/475 106/739 |

OTHER PUBLICATIONS

International Preliminary Report on Patentability in International Application No. PCT/EP2012/058939 dated Dec. 2, 2013.
Baatz, et al., "Erstes Abwarmekraftwerk nach dem Organic-Eankine-Cycle-Verfahren fur die Restnutzung der Klinkenthlerabluft" ZKG International, Aug. 2000.
Huckauf, et al., "Anwendung des ORC-Prozesses zur Abwarmenutzung beim Zementklinkerbrand" ZKG International, Mar. 2000.
Request of Opposition in European Application No. EP 12720882.5 dated Apr. 30, 2014.
Letter of Opposition in European Application No. EP 12720882.5 dated May 13, 2014.
Reply to Notice of Opposition in European Application No. EP 12720882.5 dated Oct. 10, 2014.
Withdrawal of Opposition in European Application No. EP 12720882.5 dated Mar. 31, 2015.
Decision to Discontinue the Opposition Proceedings in European Application No. EP 12720882.5 dated Jun. 12, 2015.
Zurhove, "Tail End Configuration" Konferenzbeitrag IEEE, Colorado Springs, Mar./Apr. 2010.
Zurhove, Franz-Josef "Experience with SCR" Konferenzbeitrag IEEE, Colorado Springs, Mar./Apr. 2010.
Bundesministerium fur Umwelt, "Foderprogramme Inland, Fordernehmer: Sudbayerisches Portland-Zementwerk Gebr. Wiesbock & Co. GmbH, Rohrdorf/Bayern" Forderprogramme Inland, Jul. 1, 2010.
Egli, S., "Anleitung mit Checkliste zur Energieoptimierung von Kehrichtverbrennungsanlagen" Schlussbericht, Mar. 2005.
Harder, Joachim, "Trends in power generation from waste heat in cement plants" ZKG International, May 2011.
Ryser Ingenieure AG, "KEZO—Kehrichtverwertung Zurcher Oberland, Kehrichtverbrennungsanlage Himwil, Energetische Feinanalyse" Energie in infrastrukturanlagen, Jun. 4, 2003.
Schindler, Szednyi, "Aktuelle Entwicklungen hinsichtich Abfalleinsatz und Emissionsminderungstechniken in der Zementindustrie" Umweltbundesamt GmbH, 2013 ISBN: 3-85457-713-3.
Rechnung vom 13.5.2011 bezüglich der Auslieferung der D10am Oct. 5, 2011.

\* cited by examiner

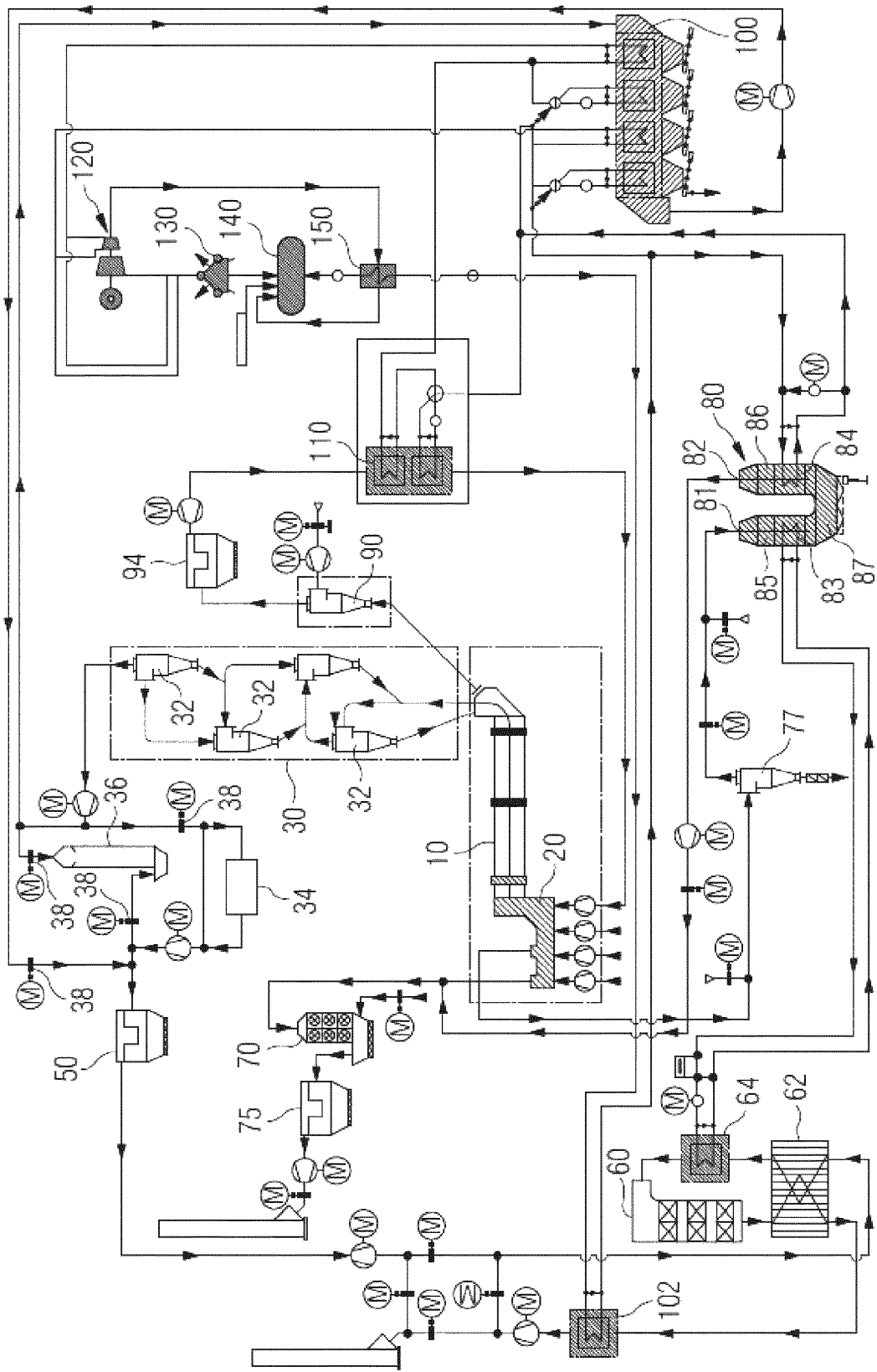

METHOD AND DEVICE FOR PRODUCING CEMENT CLINKER

PRIORITY CLAIM

This application is a continuation of pending International Application No. PCT/EP2012/058939 filed on May 14, 2012, which designates the United States and claims priority from German Patent Application No. 10 2011 050 677 filed on May 27, 2011, both of which are incorporated by reference in their entireties.

BACKGROUND OF THE INVENTION

1. Field of the Invention

The Invention relates to a device and a method for the manufacture of cement clinker, also referred to as clinker. The device has a kiln to bake raw meal into clinker. Flue gas escapes from an exhaust of the kiln.

2. Description of Relevant Art

Clinker is manufactured by baking raw powder meal in a kiln. This requires a temperature of about 1450° C. To generate this temperature, energy carriers such as coal, natural gas, crude oil, crude oil products (e.g. plastic residue), paper, wood or other replacement fuels are burned in the kiln. This combustion leads to the generation of flue gases that contain nitrous oxides (NOx) and therefore have to be subjected to denitrification. This means conversion of nitrous oxides with a reduction agent such as ammonia ($NH_3$), in the presence of oxygen to form water ($H_2O$) and nitrogen ($N_2$). The reaction temperature required for the conversion of nitrous oxides can be reduced by using catalyzers, e.g. of titanium dioxide ($TiO_2$), tungsten trioxide ($WO_3$) or vanadium pentoxide ($V_2O_5$). Such catalytic denitrification is also referred to as SCR, meaning "Selective Catalytic Reduction". Accordingly, the abbreviation SNCR ("Selective Non Catalytic Reduction") means non-catalytic denitrification. SCR for denitrification of flue gases of rotary kilns for clinker manufacture is described, for example, in patent application DE 197 56 392 A.

The flue gases of the kiln are dust-loaded and escape from the kiln at a temperature in the range of 900-1100° C. These flue gases are used to preheat the raw meal in raw meal preheaters and to deacidify it. This is usually done using cascaded cyclone separators, usually placed in heat exchanger towers. The flue gases escaping from the raw meal pre-heaters would have a temperature sufficient for SCR-denitrification, but are still charged with fine dust that has an abrasive effect on the catalyzer and may cause clogging of the catalyzer. Therefore, it is suitable for dedusting the flue gases before SCR-denitrification. There are filters with which approx. 450° C. hot gases can be dedusted, which are referred to as hot-gas filters. However, they are expensive and large. Use of bag filters is easier, but they require much lower flue gas temperatures, so that the flue gases must be cooled, filtered and then reheated to the temperature required for the catalytic reduction. This setup is also referred to as "Low Dust" or "Tail End" configuration.

DE 10 2010 004 011 B3 discloses a method and a system for manufacture of cement clinker. As usual, clinker is sintered in a rotary kiln that emits exhaust gas as well referred to as flue gas. The exhaust gas is supplied to a raw meal preheater, escapes from it and is denitrified in a downstream SCR-catalyzer. The exhaust gas is first cooled in a cooling tower, then dedusted in a filter and finally heated to the temperature best for the SCR catalyzer in a heat exchanger. As a heat source, the flue gas heated by SCR denitrification is supplied to the heat exchanger on its hot side. The heat exchanger, therefore, is a recuperator.

EP 0 461 305 81 discloses a procedure to clean the exhaust gas of a cement clinker line. The flue gas escaping from a kiln of which is guided to a heat exchanger tower for raw meal preheating. Then the flue gas either feeds a raw material mill or a cooling tower and is then recombined and supplied to a multi-level filter system. The first filter is an electrostatic dust filter. It is connected to a second filter stage with three filter chambers built as fixed-bed reactors. Before both filter stages, fresh air is added to the flue gas flow, which cools off the flue gases.

SUMMARY OF THE INVENTION

The invention addresses the object of reducing the energy loss when manufacturing clinker.

This object is solved by a device or method according to the independent claims. Advantageous embodiments of the invention are explained in the dependent claims.

In the device for producing clinker in a kiln, the heat generated in the kiln can be used particularly efficiently and diversely because the heat generated in the kiln is transferred to a heat carrier fluid through a first heat exchanger. The heat carrier fluid with the heat is transported through at least one conduit to at least a second heat exchanger to then emit them to a heat sink, e.g. to heat a flue gas flow to the temperature required for its denitrification.

The combination of the first and second heat exchanger with the heat carrier fluid circulating between, thus forms a heat displacement system. Preferably, the heat carrier fluid is circulated in a closed loop between first and second heat exchangers. The heat displacement system enables spatial separation of the heat source and heat sink, thus increasing the degree of freedom in implementation of the device, i.e. the cement clinker line. Additionally, the design of the heat exchangers and the flow speed can vary the temperature level specifically on the outlet side of the second heat exchanger across a wide range. This also increases flexibility, in this case of the method. This increased flexibility enables producing clinker much more efficiently than according to the state of the art.

The heat displacement system can, e.g., use heat first generated in the kiln but then, being removed from it with e.g. the clinker, to heat flue gases, after they have been dedusted, to a temperature required for SCR. For this, heat from the exhaust gas of a clinker cooler can be transferred in the first heat exchanger to the heat carrier fluid and thereby heat the heat carrier fluid. This heated heat carrier fluid is then transported to a heat sink and transfers at least part of the heat to the second heat sink. The second heat sink can be a dedusted flue gas flow that is then supplied to an SCR-system for denitrification. The heat sink and the heat carrier fluid are thermally connected by the second heat exchanger.

The device for manufacture of clinker has at least one kiln for baking raw meal to clinker with at least one outlet for flue gases, e.g. a rotary kiln, and means for denitrification of flue gases escaping from the kiln, e.g. an SCR-system. The raw-meal is in some cases as well referred to as raw mix. A first heat exchanger is used to supply the heat generated in the combustion process in the kiln to at least one heat carrier fluid. The heat carrier fluid is transported through at least one conduit for the heat carrier fluid to at least a second heat exchanger to heat the flue gases in the second heat exchanger with the heat carrier fluid to at least a second heat exchanger with heat previously supplied to the heat carrier fluid to then denitrify them. Accordingly, the device has means to supply the heated flue gases to the means for denitrification. The heat carrier fluid is cooled down in the second heat exchanger and may be transported via a conduit to the first heat exchanger.

The heat carrier fluid transported in the conduit enables separating the heat source that heats the flue gases to the temperature required for denitrification and from the location of flue gas heating spatially without leading to large heat loss. This adds additional freedom in demand-oriented distribution of the heat arising in the kiln. This enables better use of the heat generated in the kiln as process heat, specifically for secondary processes in clinker manufacture. The term 'heat' means the thermal energy $Q=c(T, p, V)*m*T$ being stored in a volume of the substances at a specific temperature, with $c(T,p,V)$ being the specific heat capacity, the mass and T the temperature. V and p as usual mean volume and pressure respectively. Heat can be transferred, e.g., in a heat ex-changer, partially to a different material with a lower temperature. Heat can be transferred from one material to another material and transported by the transport of substances, e.g. by the flow of a fluid with the flow. In such processes, the term of heat designates the thermal energy transferred or transported in a time interval.

The invention is based on the observation that the heat generated in the kiln is literally transported away from the kiln by two processes: On the one hand, by the hot clinker and on the other by the hot flue gases. The two heat exchangers connected to the heat carrier fluid through the conduits now enable using the heat previously taken from, e.g., the clinker, to heat the flue gases in the second heat exchanger.

Therefore, the device preferably has at least one clinker cooler, on which the hot clinker is put down. The clinker cooler has at least one cooling agent discharge to remove cooling agent heated by the hot clinker and supply it to the first heat exchanger, which supplies heat stored in the cooling agent to the heat carrier fluid. A little imprecisely but in short, it can be said that the cooling agent is heated by the clinker and then heats the heat carrier fluid. The heat carrier fluid is therefore indirectly heated by the heat generated in the kiln. At least part of this heat can then be supplied to the second heat exchanger through the conduit using the heat carrier fluid and emitted to the flue gas there. This means that new process heat does not need to be expensively generated for heating the flue gas, but the heat generated during combustion in the kiln and removed from it with the clinker can be used.

The procedure is particularly economic when the heat carrier fluid circulates in a cycle. A thermal oil is preferably used as heat carrier fluid. This is a high-boiling temperature-resilient fluid.

Preferably, the flue gas flow has at least one filter upstream of the first heat exchanger, e.g. a bag filter. This increases the service life of the catalyzer for SCR-denitrification.

Upstream of the filter, the flue gas flow preferably includes a third heat exchanger to cool flue gas to a temperature compatible with the filter and heat a second heat carrier fluid in return. The second heat carrier fluid can be supplied more heat than required for later heating of the flue gas for SCR denitrification, since the temperature of the flue gas flow after leaving the common raw meal preheater is a little higher than the temperature required at the inlet of the catalyzer for SCR by 200° C. Therefore, the heat stored in the second heat carrier fluid is preferably used as process heat for other processes, e.g. to power a steam turbine. The third heat exchanger can also specifically have at least one steam boiler.

Preferably, the device has another heat exchanger that is connected to denitrification means and the second heat exchanger to thereby provide heat from the flue gases escaping the means for denitrification to flue gases prior to entering the second heat exchanger. This 'another heat exchanger' is only referred to as recuperator below for reasons of unique reference. The recuperator can reduce heat loss when trans-porting the heat carrier fluid because less total heat has to be transported through the conduit by the heat carrier fluid to adjust the flue gas temperature required for denitrification. The recuperator makes at least part of the heat released in denitrification available for (pre)heating the flue gases.

Preferably, the device has means to conduct denitrified flue gases to another heat exchanger to heat another heat exchanger fluid with the flue gas heat, e.g. as feed water preheating for a steam boiler. This further heat exchanger is preferably subordinated to the prescribed recuperator in the denitrified flue gas flow. The outlet temperature of the flue gas at the outlet of the further heat exchanger is preferably larger or equal to about 100° C., preferably about 110° C., because water contained in the flue gas will condensate below this temperature. Gases such as HCl, $H_2SO_4$ and others would be dissolved in this water, which would cause the formation of acids, which attack conduits that are, e.g., part of a stack, in the device.

Preferably, the first heat exchanger has at least one conduit for the heat carrier fluid and subordinately to this conduit at least one further conduit to heat another heat. Particularly preferably, the further conduit of the first heat carrier fluid, e.g. a feed fluid for a steam boiler. Particularly preferably, the further conduit of the first heat exchanger serves preheating the second heat carrier fluid that is supplied to the third heat exchanger, e.g. the steam boiler named, after preheating through a conduit to be heated further there. This improvement uses the observation that the minimum temperature for the common SCR procedure depends on the flue gas composition but typically is in the range of 230-270° C. This temperature is the minimum temperature for the heat carrier fluid provided by the first heat exchanger to the second heat exchanger. Accordingly, the temperature of the heat carrier, heating the heat carrier fluid in the first heat exchanger cannot be colder after heating the heat carrier fluid than this minimum temperature for the SCR. Via the subordinate conduit for heating a feed fluid, in the simplest case, e.g., water, further useful heat can be removed from the heat carrier. This better uses the heat generated in the kiln, i.e. at the same kiln output, more process heat is available for other processes. The heat carrier may be, e.g., a cooling agent first heated by clinker.

The first and second heat carriers may be thermally connected by the heat carrier fluid conduit, but may also be spatially far apart. Therefore, all locations where process heat generated in the kiln is generated and can be sensibly drawn off are possible for placement of the first heat exchanger. For example, the kiln may have a branch for flue gases to remove contamination in the rawmeal, such as chlorides, sulphur, alkali metals from the circuits between the kiln and raw-meal preheaters. This is also referred to as a bypass. The first heat exchanger can be connected to the branch so that at least part of the branched-off flue gas flow is supplied to the first heat exchanger to supply the heat stored in the flue gas flow to the heat carrier fluid. The flue gas flow is cooled off during this. The cooled flue gas flow may be used, e.g., as cooling air for a clinker cooler and thus be returned to the kiln. Alternatively, the cooled flue gas partial flow can also be retuned to the other flue gases downstream of the raw-meal preheater.

Usually, the kiln is connected to at least one raw-meal preheater on the exhaust side to preheat and at least partially deacidify the raw meal with the heat of the flue gases. In this case, the first heat exchanger can be connected to a flue gas outlet of the raw meal preheater so that flue gas escaping from the raw-meal preheater heats the heat carrier fluid.

BRIEF DESCRIPTION OF THE DRAWINGS

In the following, the invention will be described by way of example, without limitation of the general inventive concept, on examples of embodiment and with reference to the drawings.

FIG. 1 shows a flow diagram of cement clinker line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The flow diagram in FIG. 1 shows a preferred embodiment of the invention.

The only drawing shows an example of a flow diagram of a cement clinker line. Core of the line is a rotary kiln 10 between a clinker cooler 20 and heat exchanger tower 30. The rotary kiln 10 has a burner protruding into the rotary kiln 10 from the clinker cooler side (not illustrated), to produce the heat required for clinker manufacture by combustion in the rotary kiln 10. The flue gas arising in combustion escapes from the rotary kiln 10 on the heat exchanger tower side. From this side, raw-meal is in return supplied to the rotary kiln 10. The heat exchanger tower 30 in this example has four cyclones 32 connected in a cascade, i.e. serially connected, for preheating and partial deacidification of raw-meal by heat of the flue gas and for gross dedusting of the flue gas. Any other suitable number of cyclones may be used as well. The flue gas escaping from the heat exchanger tower 30 has a typical temperature of 300-500° C. Before the flue gas is supplied to a flue gas filter 50 for further dedusting, it is cooled to a temperature below at least approximately 150° C. This leads to condensation of heavy metals in the flue gas, such as mercury and thallium, on the dust contained in the smoke. This dust is separated in the flue gas filter 50 and thus acts as cold trap for heavy metals. Additionally, the volume to be dedusted (per unit of time) is drastically reduced and more cost-efficient fabric filter techniques can be used. Three options are intended to cool the flue gases:

(1) Supply of the flue gases to a steam boiler 100, to produce steam that is expanded in a turbine setup 120, e.g. to power a generator, (2) Supply of the flue gases to a raw mill 34, to dry the raw material supplied to the raw mill and preheat the raw-meal, and (3) Supply of the flue gases to an evaporation cooler 36.

The corresponding conduits have flaps 38 to separate the flue gas flow between the three cooling options. In regular operation, as little as possible, that is no or hardly any flue gas should be cooled with the evaporation cooler 36, since the heat removed from the flue gas in the evaporation cooler 36 is no longer available as process heat. The evaporation cooler thus preferably only has the function of emergency cooling if the steam boiler 100 cannot be used.

The cooled flue gas is then dedusted in a flue gas filter 50 and the dedusted flue gas is supplied to an SCR-system 60 for catalytic denitrification of the flue gases. For this, it must be heated to at least 230° C.-270° C. Therefore, it is supplied from the flue gas filter 50 first to a recuperator 62 that is supplied by denitrified flue gas escaping from the SCR system in the counterflow, so that heat is transferred from the denitrified (pure gas) to the flue gas to be subjected to denitrification (raw gas). The flue gas to be denitrified escaping from the recuperator is supplied to a further heat exchanger to heat it further. This further heat exchanger 64 is also referred to as "second heat exchanger" in the scope of this patent application. The heat necessary for heating the flue gas is supplied to the second heat exchanger 64 through a thermal oil as heat carrier fluid. The flue gas heated in this manner in two steps (first step recuperator 62, second step "second heat exchanger 64") is supplied to the SCR-system 60 and denitrified there.

The denitrified flue gas heats the flue gases to be denitrified in the recuperator 62 as already described and is cooled off accordingly. Then the flue gas is cooled in another heat exchanger 102 to preferably about 110° C. and can be discharged through a stack as indicated. The heat removed from the flue gas in the heat exchanger 102 is used for feed water preheating for the steam boiler 100 and/or a boiler 110. Alternatively, they can also be fed into a district heat network or used for power generation in an ORC-procedure. "ORC" is the common abbreviation for "Organic Rankine Cycle", a procedure in which steam turbines are operated with the steam of low-boiling organic fluids.

Additionally, the preferably continuous removal of clinker from the rotary kiln 10 removes heat from the rotary kiln 10. This clinker, which is initially about 1450° C. hot, is cooled in the clinker cooler 20. The cooling agent is preferably air. The clinker cooler 20 therefore is a heat exchanger. Part of the cooling agent heated in the clinker cooler 20 is drawn off from the clinker cooler through a middle air outlet 24. The heat stored in the discharged cooling agent, hereinafter briefly called exhaust, heats thermal oil as heat carrier fluid in a heat exchanger 80 after gross dedusting in a cyclone 77. The heat transferred to the heat carrier fluid can also be transported across long distances with low heat loss, specifically to heat the flue gas to be denitrified to the temperature required for denitrification in the second heat exchanger 64.

The heat exchanger 80 has an inlet 81 for the exhaust that is routed first through a first conduit 83 in the heat exchanger to heat the heat carrier fluid that flows through the first conduit. Subordinately to the first conduit 83, there is a second conduit 84 through which the exhaust is routed. In the second conduit 84, another heat carrier fluid flows and is heated by the exhaust. In the example shown, the other heat carrier fluid is water, which is preheated as feed water for the steam boiler 100 and/or a boiler 110. The exhaust leaves the heat exchanger 80 through an outlet 82. The exhaust is routed in a flow channel in the heat ex-changer 80. The flow channel is U-shaped, i.e. it has two free legs 85, 86 that are connected by a bottom cross leg 87. Each of the two free legs 85, 86 has one of the two conduits 83, 84. Deflection of the exhaust in the area of the cross leg 87 leads to clinker dust carried along in the exhaust collecting at the bottom of the cross leg, where it can be separated.

The outlet 85 is connected to a cooler 70 to set the temperature for the downstream filter 75. The filter 75 is used to dedust the exhaust air, which can then, e.g., be discharged through an indicated stack.

The device for baking of clinker has a chloride bypass in addition to the flue gas treatment described above. Part of the flue gas escaping from the rotary kiln 10 is not supplied to the raw-meal preheater but first mixed with fresh air in a mixing chamber 90. A mixing temperature of about 450° C. (400° C.-500° C.) is set. The temperature achieved in this manner permits hot gas dedusting in a hot gas filter 94. The hot gas filter is followed by a boiler 110. In the boiler, steam is generated that is relieved in the turbine setup. The flue gas escaping from the boiler is used as cooling air for the clinker cooler 20 and returned to the rotary kiln 10 through the clinker cooler 20. Because the flue gases escaping from the boiler still have a temperature clearly above the usual ambience temperatures, the return of the flue gases through the clinker cooler enables achievement of a high secondary air temperature and the fuel consumption drops accordingly in return.

It will be appreciated to those skilled in the art having the benefit of this disclosure that this invention is believed to provide a method an apparatus for cement clinker manufacture. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 kiln, here as rotary kiln
20 clinker cooler
24 middle air outlet
30 heat exchanger tower
32 cyclone
34 raw meal mill
36 evaporation cooler
38 valve/flap
50 flue gas filter for dedusting/cold trap for heavy metals
60 SCR.-system
62 recuperator I heat exchanger
64 (second) heat exchanger
70 cooler, here e.g. air/air heat exchanger
75 flue gas filter for dedusting
77 cyclone for gross dust separation
80 heat exchanger
81 inlet
82 outlet
83 first conduit for heat carrier fluid
84 second conduit for heat carrier fluid
85 free leg
86 free leg
87 cross leg
90 mixing chamber
94 hot-gas dedusting
100 waste heat boiler/steam boiler
102 heat exchanger for feed water preheating
110 boiler for steam production
120 turbine setup
130 condenser I
140 condenser II
150 condenser III

The invention claimed is:

1. A device for manufacturing clinker, the device comprising:
    a kiln for baking a raw-meal to clinker, the kiln having an outlet for flue gases generated in the kiln;
    a clinker cooler for cooling clinker taken from the kiln with a cooling agent, the clinker cooler including a cooling agent inlet and a cooling agent outlet; and
    means for denitrification of the flue gases generated in the kiln;
    wherein
    (i) the device has at least one first heat exchanger with:
        a first inlet for receiving the cooling agent from the cooling agent outlet of the clinker cooler, and a first outlet for directing the cooling agent out of the at least one first heat exchanger, and
        a second inlet for receiving a heat carrier fluid, and a second outlet for directing the heat carrier fluid out of the at least one first heat exchanger after heat generated in the kiln during the combustion process has been transferred from the cooling agent to the heat-carrier fluid,
    (ii) the second outlet of the at least one first heat exchanger is connected to at least one second heat exchanger via at least one conduit for the heat-carrier fluid in order to heat the flue gases in the at least one second heat exchanger with the heat previously provided to the heat-carrier fluid; and
    (iii) the at least one second heat exchanger has means for conducting the heated flue gases to the means for denitrification.

2. The device according to claim 1, wherein
    the clinker cooler has at least one cooling-agent tap for drawing off cooling agent heated by the clinker and conducting it to the at least one first heat exchanger, whereby heat stored in the cooling agent is conducted to the heat-carrier fluid.

3. The device according to claim 1, wherein
    the device has a further heat exchanger that is connected to the means for denitrification and to the at least one second heat exchanger in such manner that heat of the flue gases issuing from the means for denitrification heats flue gases entering into the at least one second heat exchanger.

4. The device according to claim 1, wherein
    the first heat exchanger comprises at least one conduit for the heat-carrier fluid and, subsequent to the at least one conduit, at least one further conduit for heating a feed fluid of a steam boiler.

5. The device according to claim 1, wherein
    the heat-carrier fluid is a first heat-carrier fluid, and
    the device comprises a further heat exchanger and means for conducting denitrided flue gases to the further heat exchanger, in order to heat a second heat-carrier fluid with heat of the denitrided flue gases.

6. The device according to claim 1, wherein
the device has a flue gas return facility for returning a portion of the flue gases of the kiln back into the kiln on an air inlet side of the kiln, with the at least one first heat exchanger being incorporated in the flue gas return facility such that at least a portion of a flue gas stream is conducted to the at least one first heat exchanger in order to conduct heat stored in the flue gas stream to the heat-carrier fluid.

7. The device according to claim 1, wherein,
an exhaust air outlet side of the kiln is connected to at least one raw-meal preheater in order to preheat a raw mix of meal with heat stored in the flue gases, with the raw-meal preheater having a flue gas outlet that is connected to the at least one first heat exchanger in order to conduct heat contained in the flue gas to the heat-carrier fluid.

8. The device according to claim 1, wherein the device further comprises
at least one filter configured to dedust flue gases, and
at least one conduit for conducting dedusted flue gases from the filter to the means for denitrification in order to denitride the flue gases following the dedusting.

9. A method for manufacturing clinker, the method comprising:
baking a raw-meal to clinker in a kiln;
denitrifying flue gases generated in the kiln;
heating a heat-carrier fluid in a first heat exchanger with heat generated during the baking by:
directing a cooling agent into a first inlet of the first heat exchanger, through the first heat exchanger, and out a first outlet of the first heat exchanger; and
directing the heat-carrier fluid into a second inlet of the first heat exchanger, through the first heat exchanger in thermal communication with the cooling agent to transfer heat from the cooling agent to the heat-carrier fluid, and out a second outlet of the first heat exchanger;
conducting the heat-carrier fluid from the second outlet of the first heat exchanger to a second heat exchanger;
heating the flue gases in the second heat exchanger, with heat being drawn off from the heat-carrier fluid;
conducting the flue gases previously heated in the second heat exchanger to means for denitrification in order to denitride the flue gases.

10. The method according to claim 9, further comprising at least the steps of:
conducting clinker from the kiln to a clinker cooler;
cooling the clinker in the clinker cooler whilst simultaneously heating at least one cooling agent;
conducting the at least one cooling agent heated in the clinker cooler to the first heat exchanger in order to conduct heat stored in the cooling agent to the heat-carrier fluid.

11. The method according to claim 9, further comprising at least the steps of:
conducting a portion of the flue gases from the kiln to the first heat exchanger in order to conduct heat stored in the portion of the flue gases to the heat-carrier fluid, with the flue gas being cooled; and
conducting the cooled flue gas as supply-air to the kiln.

12. The method according to claim 9, further comprising at least:
preheating of raw-meal with heat from flue gas escaping the kiln in a raw-meal preheater and conducting flue gases taken from the raw-meal preheater to the first heat exchanger in order to conduct heat stored in the flue gas to the heat-carrier fluid.

13. The method according to claim 9, wherein
the flue gases are filtered before being denitrided.

* * * * *